United States Patent [19]
Hillgärtner

[11] Patent Number: 5,150,633
[45] Date of Patent: Sep. 29, 1992

[54] SHIFTING ARRANGEMENT FOR A MOTOR VEHICLE TRANSMISSION

[75] Inventor: Klaus Hillgärtner, Wimsheim, Fed. Rep. of Germany

[73] Assignee: Dr. Ing. h.c.F. Porsche AG, Fed. Rep. of Germany

[21] Appl. No.: 756,784

[22] Filed: Sep. 9, 1991

[30] Foreign Application Priority Data

Sep. 15, 1990 [DE] Fed. Rep. of Germany ....... 4029330

[51] Int. Cl.$^5$ .................... B60K 20/00; G05G 5/06
[52] U.S. Cl. .................................... 74/475; 74/527
[58] Field of Search ............. 74/335, 475, 473 R, 74/527

[56] References Cited

U.S. PATENT DOCUMENTS

| | | | |
|---|---|---|---|
| 3,333,485 | 8/1967 | Deli et al. | 74/475 X |
| 4,222,284 | 9/1980 | Bellino et al. | 74/475 X |
| 4,546,665 | 10/1985 | Bieber | 74/475 X |
| 4,830,156 | 5/1989 | Bellah et al. | 74/475 X |
| 4,912,997 | 4/1990 | Malcolm et al. | 74/475 X |
| 4,987,792 | 1/1991 | Mueller et al. | 74/335 X |
| 5,044,220 | 9/1991 | Raff et al. | 74/335 X |
| 5,062,314 | 11/1991 | Maier et al. | 74/475 |
| 5,070,740 | 12/1991 | Giek et al. | 74/335 X |

FOREIGN PATENT DOCUMENTS

| | | |
|---|---|---|
| 3807881 | 9/1989 | Fed. Rep. of Germany . |
| 59-70240 | 8/1984 | Japan . |
| 1527165 | 10/1978 | United Kingdom . |
| 2037916 | 7/1980 | United Kingdom . |

OTHER PUBLICATIONS

VEB Verlag Technik Berlin 1959—Bauelemente der Feinmechanik, F. Kozer.
AWF—Sperrgetriebe, Bestell Nr. 6061—pp. 33-38, 1955.

Primary Examiner—Allan D. Herrmann
Assistant Examiner—David W. Laub
Attorney, Agent, or Firm—Evenson, Wands, Edwards, Lenahan & McKeown

[57] ABSTRACT

A shifting arrangement for a motor vehicle transmission has a selector lever which, for preselecting automatic gear positions, can be swivelled in a first shifting channel and, by way of a transverse channel, can be changed-over into a second shifting channel in which the transmission gears can be shifted manually. Both end positions of the change-over movement can be locked by a spring detent which has a detent lever equipped with a detent link, a tension spring, and a detent member of the selector lever which engages in the detent link.

11 Claims, 2 Drawing Sheets

SHIFTING ARRANGEMENT FOR A MOTOR VEHICLE TRANSMISSION

BACKGROUND AND SUMMARY OF THE INVENTION

The present invention relates to a shifting arrangement for a motor vehicle transmission, having a selector lever which is disposed in a cardan joint and which, for the preselecting of transmission gears can be swivelled in a first shifting channel constructed in a shift control housing and, by way of a transverse channel, can be changed over into a second shifting channel which is parallel to the first shifting channel. The selector lever, in both end positions of the change-over movement, is held in a resilient detent link by a detent member.

A shifting arrangement of the above type is known from German Patent Document DE-A 38 07 881. By means of a selector lever, which can be swivelled in a first shifting channel extending in the driving direction of the motor vehicle, the various shifting positions of an automatic transmission can be preselected. Via a vertical transverse channel, the selector lever can be changed over into a second shifting channel in which the various transmission gears can be manually shifted by means of the selector lever. A spring detent arrangement, which is formed by a leaf spring fastened to the lower part of the selector lever and a detent member of the selector lever which interacts with it, is used for the locking of the two end positions of the change-over movement. Since such leaf springs as a result of manufacturing tolerances have different spring forces, a readjusting is required during assembly in order to achieve a desired contact pressure force.

It is an object of the invention to provide a shifting arrangement which permits a locking of the selector lever that is free of play at low cost and does not require a readjusting during assembly.

This and other objects are achieved by the present invention which provides a shifting arrangement for a motor vehicle transmission having a shift control housing with a first shifting channel, a second shifting channel parallel to the first shifting channel, and a transverse channel. A selector lever is arranged in a cardan joint and can be swivelled in the first shifting channel for preselecting transmission gears and, via the transverse channel, can be changed over into the second shifting channel. A joint hub is coupled to the selector lever. A resilient detent link and a detent member hold the selector lever, in both end positions of the change-over movement, in the detent link. A tension spring is coupled to the detent link. The detent link includes a detent lever which, on a first side, is rotatably disposed in the joint hub, and on a second side, is braced by the tension spring against the detent member.

When a detent link is constructed in a detent lever which is pivotally connected to the selector lever and is braced against a detent member of the selector lever by means of a tension spring, a locking can be achieved that is free of play because of the fact that the detent member engages in the detent link. The contact pressure force can be precisely preselected by the selection of the tension spring and is always the same in the case of all shifting arrangements without any readjusting whatsoever.

Other objects, advantages and novel features of the present invention will become apparent from the following detailed description of the invention when considered in conjunction with the accompanying drawings.

DETAILED DESCRIPTION OF THE DRAWINGS

Figure 1:
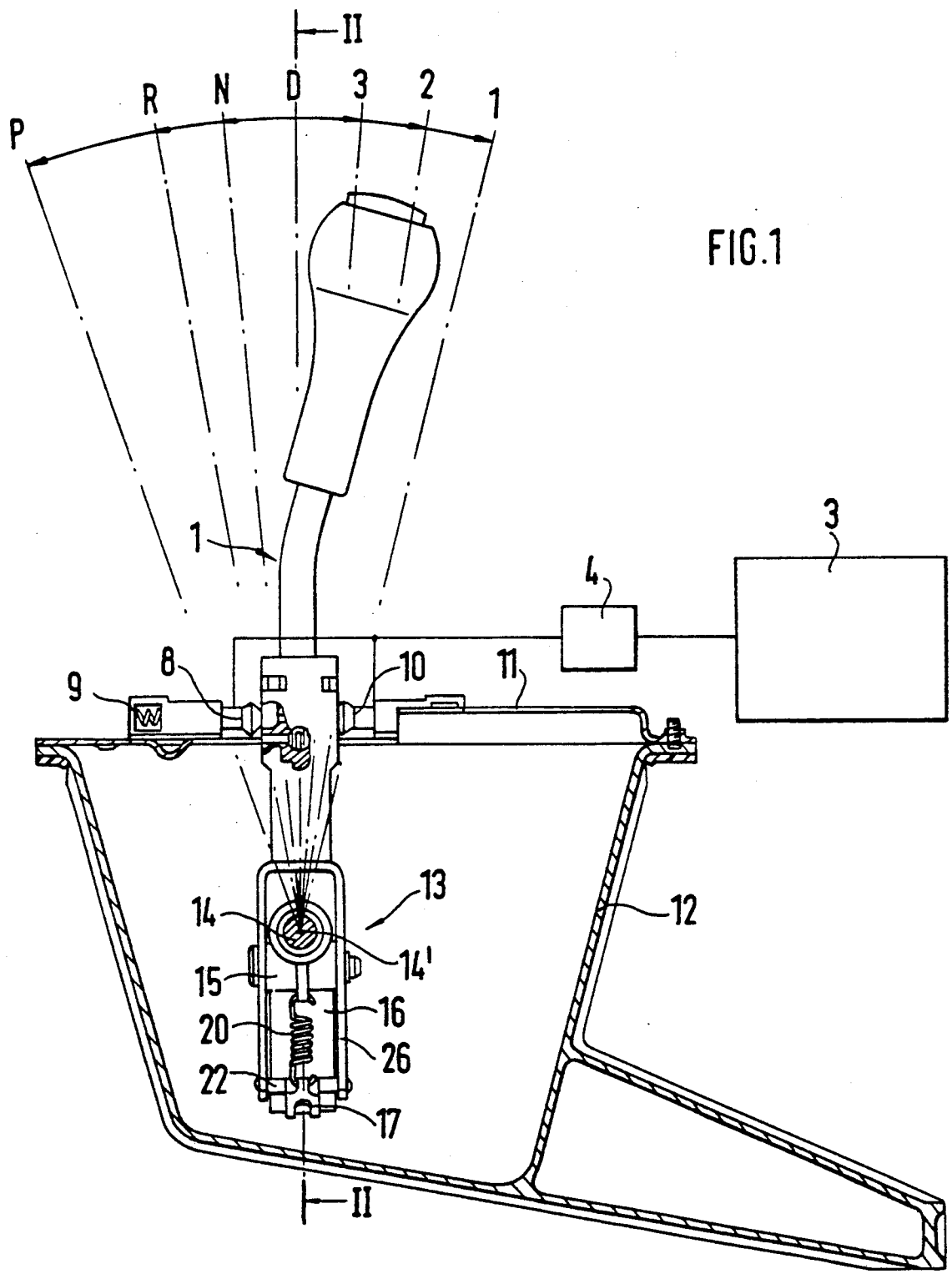
FIG. 1 is a longitudinal sectional view of a shifting arrangement constructed in accordance with an embodiment of the present invention.
Figure 2:
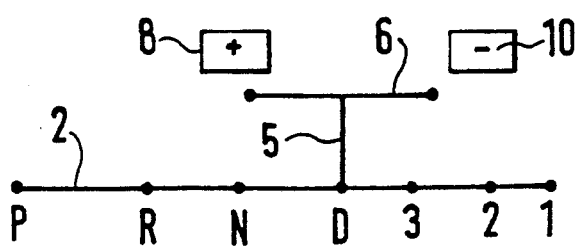
FIG. 2 is a schematic top view of the shifting channels.
Figure 3:
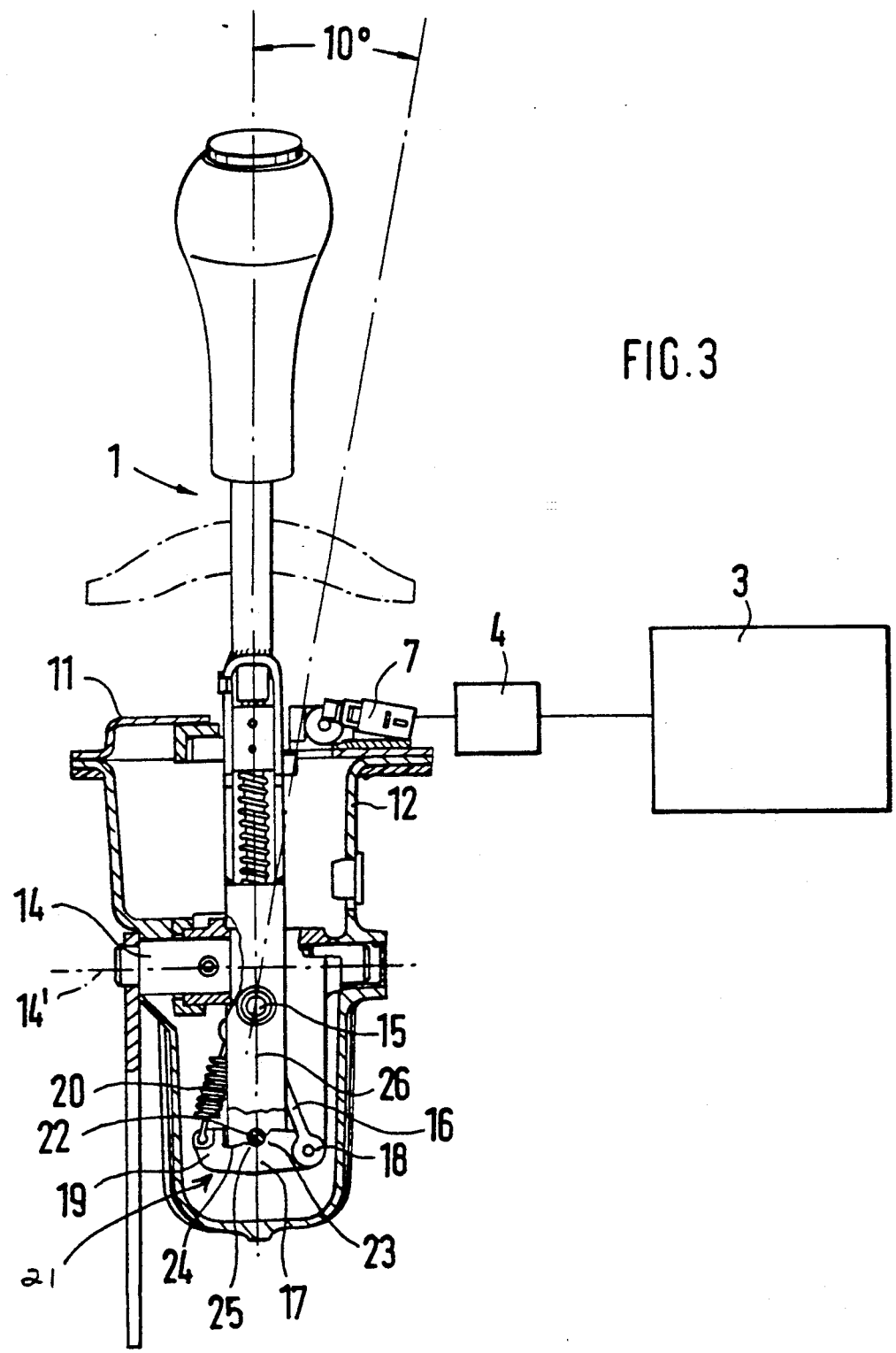
FIG. 3 is a cross-sectional view of the shifting arrangement according to Line III—III of FIG. 1.

By means of a selector lever 1 which can be swivelled in a first shifting channel 2 in the longitudinal direction of the motor vehicle, the different positions P=parking, R=reverse gear, N=neutral - zero, D=drive, 3=3rd gear, 2=2nd gear, 1=1st gear of an automatic transmission 3 can be preselected. The selected positions are detected by sensors and are fed to a control unit 4 by means of which an automatic transmission 3 of a conventional construction can be controlled electrohydraulically. From the selected position D, the selector lever 1 can be changed over via a vertical transverse channel 5 into a second shifting channel 6 which is parallel to the first shifting channel 2. The change-over operation is detected by a sensor 7 which, in the change-over process, emits a signal to the control unit 4.

Even in the case of a slight swivelling of the selector lever 1 in the second shifting channel 6 in the driving direction of the motor vehicle, a plus sensor 8 will respond. The signal of the plus sensor 8 causes the control unit 4 to carry out an upshifting by one gear in the automatic transmission 3. Subsequently, the selector lever 1 is set back into the neutral center position of the shifting channel 6 by means of a spring 9. If the plus sensor 8 is touched again by the selector lever 1, another upshifting takes place by one gear unless the highest gear is already engaged. When the selector lever 1 is swivelled against the driving direction, a minus sensor 10 by way of the control unit 4 triggers a backshifting by one gear on the automatic transmission 3.

Both shifting channels 2 and 6 as well as the transverse channel 5 connecting them are constructed in a cover plate 11 of a hollow frame 12 in which the selector lever is disposed. In order to be able to carry out the swivel movements and the change-over movement which is perpendicular with respect to the swivel movements, the selector lever 1 has a cardan joint 13 consisting of two pivot pins 14 and 15 arranged perpendicularly with respect to one another. The upper pivot pin 14 is fastened in the hollow frame 12. Selector lever 1 is disposed on it by means of a joint hub 16. In the joint hub 16, the pivot pin 15 is fastened on which the selector lever 1 is disposed for the change-over from one shifting channel 2 to the other shifting channel 6. The change-over angle which is required for this purpose amounts to approximately 10°.

For the functioning of both transmission types, in one case, as an automatic transmission and, in the second shifting channel 6, as a manually shiftable transmission, it is important that the selector lever 1 in both end positions of the change-over movement can be locked securely and without play. A detent lever 17 is used for this purpose which, on its one side 18, is disposed on the underside of the joint hub 16 and, on its other side 19, is braced toward the joint hub 16 by means of a tension spring 20. The longitudinal axis of the tension spring 20 is perpendicular to the axis 14' of the pivot pin 14. When the selector lever 1 is swivelled in the first shifting channel 2, the joint hub 16 is also swivelled. During the change-over into the second shifting channel 6, the joint hub 16 is held fast by means of the bearing pin 14. A straight pin 22, which is fastened in the two legs of the U-shaped selector lever bottom part 26, engages in a detent link 21 of the detent lever 17. The detent link 21 comprises two semicircular recesses 23 and 24 and an elevation 25 disposed in the center between them. The lateral flanks of the recesses 23, 24 are used as stops for the bounding of the angles of the change-over movement. The radius of the recesses 23, 24 is smaller than the radius of the straight pin 22 so that the pin 22 is held without play between the lateral flanks of the recesses 23, 24. When the joint hub 16 and the detent lever 17 are made of plastic, the change-over operation and the locking can take place almost noiselessly.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A shifting arrangement for a motor vehicle transmission, comprising:
   a shift control housing having a first shifting channel, a second shifting channel parallel to the first shifting channel, and a transverse channel;
   a selector lever arranged in a cardan joint and which can be swivelled in the first shifting channel for preselecting transmission gears and, via the transverse channel, can be changed over into the second shifting channel;
   a joint hub coupled to the selector lever;
   a resilient detent link and a detent member that holds the selector lever, in both end positions of the change-over movement, in the detent link; and
   a tension spring coupled to the detent link;
   wherein said detent link includes a detent lever which, on a first side, is rotatably disposed in the joint hub, and on a second side, is braced by the tension spring against the detent member.

2. A shifting arrangement according to claim 1, wherein the cardan joint includes a first pivot bearing coupled to the selector lever, and wherein a longitudinal axis of the tension spring is perpendicular to an axis of the first pivot bearing.

3. A shifting arrangement according to claim 1, wherein the detent member is a straight pin.

4. A shifting arrangement according to claim 3, further comprising a U-shaped selector lever bottom part having two legs and wherein the straight pin is fastened in the two legs.

5. A shifting arrangement according to claim 1, wherein the detent link comprises two semicircular recesses and an elevation disposed in the center between the recesses.

6. A shifting arrangement according to claim 5, wherein the recesses have lateral flanks which act as stops for the end positions of the change-over movement.

7. A shifting arrangement according to claim 1, wherein the detent lever, the tension spring and the straight pin are below the cardan joint.

8. A shifting arrangement according to claim 1, wherein the joint hub and the detent lever are made of plastic.

9. A shifting arrangement according to claim 3, wherein a radius of the straight pin is larger than a radius of the recesses.

10. A shifting arrangement according to claim 5, wherein a radius of the straight pin is larger than a radius of the recesses.

11. A shifting arrangement according to claim 4, wherein the joint hub and the detent lever are made of plastic.

* * * * *